UNITED STATES PATENT OFFICE.

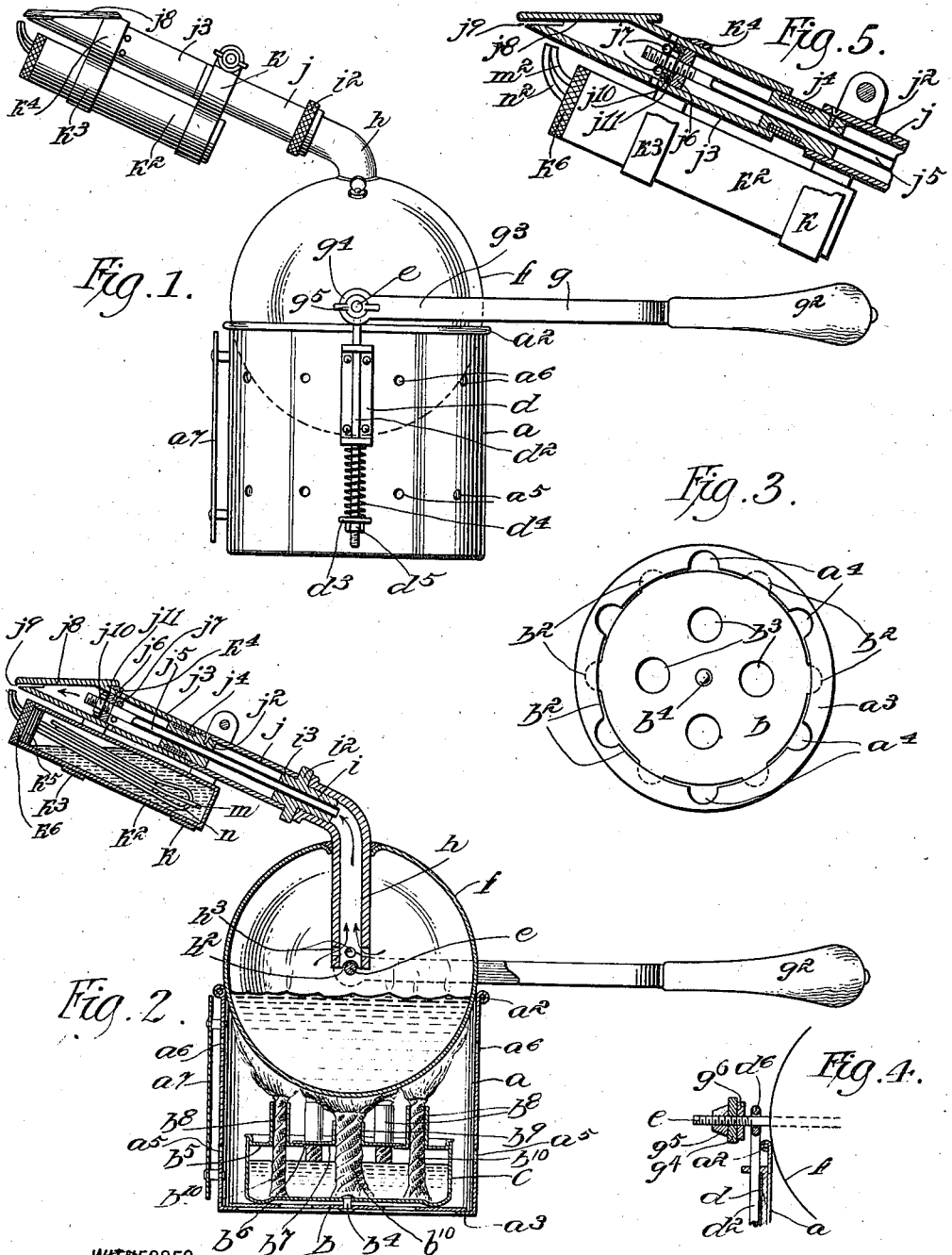

GEORGE W. BROWNE, OF BROOKLYN, NEW YORK.

VAPORIC-STEAM GUN.

964,386.  Specification of Letters Patent.  Patented July 12, 1910.

Application filed May 29, 1909. Serial No. 499,179.

*To all whom it may concern:*

Be it known that I, GEORGE W. BROWNE, a citizen of the United States, and residing at Brooklyn, in the county of Kings and State of New York, have invented certain new and useful Improvements in Vaporic-Steam Guns, of which the following is a specification, such as will enable those skilled in the art to which it appertains to make and use the same.

This invention relates to what I call vaporic steam guns; and the object thereof is to provide an improved device of this class intended to be used as a means for destroying all kinds of crawling or flying insects by means of a jet of live steam, or by means of a live steam in connection with a vapor of an essential oil known to be noxious to or destructive of insect life.

The invention forming the basis of this application is an improvement on that described and claimed in U. S. Letters Patent granted to me Nov. 3, 1908, No. 902,707, and the invention which forms the basis of this application is fully disclosed in the following specification, of which the accompanying drawing forms a part, in which the separate parts of my improvement are designated by suitable reference characters in each of the views, and in which:—

Figure 1 is a side view of my improved vaporic steam gun, Fig. 2 a view similar to Fig. 1 but showing the device in section, Fig. 3 a bottom plan view of the main or body part of the device with part of the construction omitted, Fig. 4 a partial section on the line 4—4 of Fig. 1, and Fig. 5 a view similar to Fig. 2 but showing only the nozzle part of the device and showing the parts thereof in a different position.

In the practice of my invention, I provide a cylindrical shell or casing $a$ which is open at the top and provided with a wire reinforced bead $a^2$ and the bottom edge thereof is turned inwardly to form an annular flange $a^3$, and said flange is provided, as shown in Fig. 3, with a plurality of recesses $a^4$ which are preferably semi-circular in form, and the shell or casing $a$ is provided with a removable bottom $b$ provided at its edges with projections $b^2$ adapted to pass through the recesses $a^4$, and said bottom $b$ is also provided, in the form of construction shown, with apertures $b^3$ by which it may be manipulated, together with the reservoir $c$ of the burner which I employ.

The reservoir $c$ is secured centrally to the bottom $b$ by a rivet pin $b^4$ or in any desired manner, and said reservoir is provided with a cover $b^5$ having a central opening $b^6$ closed by a supplemental cap or cover $b^7$, and the cover $b^5$ is provided with wick tubes $b^8$ any desired number of which may be employed, and the supplemental cap or cover $b^7$ is provided with a wick tube $b^9$, and passed through the wick tubes $b^8$ and $b^9$ and extending downwardly into the reservoir are wicks $b^{10}$.

The casing $a$ is also provided in the bottom part thereof with air inlets $a^5$, and in the top portion thereof with outlets $a^6$ for the products of combustion, and said reservoir is also provided at one side with a shield $a^7$.

Secured to the opposite sides of the casing $a$ and to the top portion thereof are keepers $d$ through which are passed vertically arranged rods $d^2$, and spiral springs $d^4$ are placed on these rods below said keepers and held in place by washers $d^3$ and nuts $d^5$ with which the rods $d^2$ are provided, and the object of this construction is to tensionally connect the shell or casing $a$ and the boiler $f$ hereinafter described in such manner that they will be free to turn one within or upon the other.

The upper ends of the rods $d^2$ extend above the top of the casing $a$ and are provided with heads $d^6$ through which is passed a shaft or rod $e$, and said shaft or rod passes centrally through and supports a spherical boiler $f$ which is secured thereto, and the ends of said shaft or rod project a predetermined distance from the opposite sides of the boiler $f$, and mounted thereon is a handle yoke $g$ provided with a handle $g^2$, and the sides $g^3$ of which are provided with heads $g^4$ through which the end portions of the shaft or rod $e$ pass, and the ends of said shaft or rod are threaded and provided with thumb nuts $g^5$, and placed between the heads $d^6$ of the rods $d^2$ and the heads $g^4$ of the side members $g^3$ of the handle yoke $g$ are threaded washers or nuts $g^6$, and by means of this construction the handle yoke may be rigidly secured to said rod or shaft and the boiler $f$ may be swung into or turned into different positions by means of the handle or handle yoke $g$.

Secured in the boiler $f$ is a radially arranged tube $h$, the inner end of which, in the form of construction shown, is provided in the opposite sides thereof with transverse recesses $h^2$ and rests on the rod or shaft $e$, and the said inner end portions of the tube $h$ are provided with ports or passages $h^3$, and the outer end portion of said tube is curved laterally at an obtuse angle to the body portion of said tube, and screwed thereinto is a plug $i$ having a flange or collar $i^2$ beyond which is a projection $i^3$ on which is mounted a nozzle tube $j$ in the outer end of which is secured a cylindrical plug $j^2$ on which is mounted a supplemental nozzle tube $j^3$ which is movable longitudinally on the plug $j^2$, and said plug $j^2$ is provided with a packing $j^4$, and passed longitudinally through the plug $i$, the nozzle tube $j$ and the plug $j^2$ is a steam tube $j^5$ which is secured in the plug $i$, and the outer end portion of which is provided with a piston or plunger head $j^6$ which is screwed thereonto, and fits in the supplemental nozzle tube $j^3$ and on which said supplemental nozzle tube is movable.

On the end of the steam tube $j^5$ is a nut $j^{10}$ between which and the plunger head $j^6$ is placed a flexible washer $j^{11}$, these parts being shown in Fig. 2 and more clearly shown in Fig. 5, and the supplemental nozzle tube $j^3$ is provided with side ports or passages $j^7$ which are inwardly of the piston or plunger head $j^6$ when the said supplemental nozzle tube is in its normal position, and the outer end of the supplemental nozzle tube is beveled or inclined, or provided with a beveled or inclined cap $j^8$, and at the extreme end of said supplemental nozzle tube is a discharge port or passage $j^9$.

Secured on the outer end portion of the nozzle tube $j$ is a clamp device $k$ in which is secured an atomizer flask $k^2$, and connected with the outer end portion of the flask $k^2$ is another clamp device $k^3$ having a part $k^4$ through which the supplemental nozzle tube $j^3$ is movable, and the outer end portion of the flask $k^2$ is closed by a threaded plug $k^5$ having a milled head $k^6$, and placed in the atomizer flask $k^2$ are two tubes $m$ and $n$ the ends of which extend through the threaded plug $k^5$ as shown at $m^2$ and $n^2$ and are curved in the direction of the port or passage $j^9$, and one of said tubes terminates adjacent to the inner end of the flask $k^2$ and the end of the other is formed into a loop and terminates adjacent to the plug $k^5$ as clearly shown in Fig. 2, and by means of this construction the contents of the flask $k^2$ may be discharged therefrom in the operation of the device as hereinafter described in any position in which the boiler $f$ may be held and without leakage from said flask, as the open end of one of said tubes within said flask will be immersed when the other is open and free to admit air.

It will be understood that the device may be manipulated by means of the handle of handle yoke $g$ so that the nozzle or nozzle tube may be held in any desired position either at a downward inclination or at an upward inclination, and no matter in what position the handle and boiler $f$ be held the casing $a$ will always swing vertically and the burner composed of the reservoir $c$, the cover $b^5$ thereof, the supplemental cover $b^7$ and the wick tubes $b^8$ and $b^9$ together with the wicks $b^{10}$ will always be suspended when the device is in use directly beneath the boiler $f$ which is free to rotate in the top of the casing $a$; and by conecting the casing $a$ with the boiler by means of the keepers $d$ secured to said casing and the rods $d^2$ connected with the boiler and employing the spiral springs $d^4$ as shown and described, the connection between the casing $a$ and the boiler is a tensional connection, and while said boiler is free to swing in said casing the contact between said parts is more or less close and the casing may be turned on the boiler, or the boiler may be turned in the casing by hand and the springs $d^4$ will hold them adjustable in any position in which they may be placed.

In the operation of this device, the boiler and nozzle or nozzle tube may be so held, at times, that the flask $k^2$ will be close to the casing $a$ and burner, and the shield $a^7$ is intended to act as a heat guard for said flask under such conditions.

It will also be understood that the casing $a$ shields the burner which when in use is entirely inclosed by said casing and by the boiler $f$, and by means of this construction there is no danger of setting fire to any inflammable material adjacent to which the device may be used.

Any suitable liquid fuel may be used in the reservoir $c$ of the burner, and the said burner may be inserted into or removed from the casing $a$ whenever desired by inserting the thumb and two or more fingers into the apertures $b^3$ in the bottom $b^6$ of the casing $a$ to which the burner is secured and partially rotating said burner so that the propjections $b^2$ register with the recesses $a^4$ in the flange $a^3$, this construction and operation being similar to that of other devices of this class. My invention however, is not limited to any particular construction of a burner, nor to any particular means for inserting the same into and holding it in the casing $a$, and any suitable detachable burner may be employed.

By connecting the rods $d^2$ with the casing $a$ in the manner described, and by employing the spring $d^4$ and the nuts $d^5$, the rods $d^2$ may be vertically adjusted and the boiler $f$ may be raised or lowered within certain limits as will be readily understood.

In the operation of the device it may be held by means of the handle $g^2$ and so manipulated that the nozzle may be turned into any desired direction or into any desired position or locality, and in this way a jet of live steam may be directed into the corners of a ceiling, or around a molding, or beneath a base-board or into any crevice, crack or locality where insects hide or accumulate, and into the various parts of a bed-stead, its joints or connections, and a jet of steam from the nozzle $j^3$ may be directed through a mattress or any part of the covering or clothing of a bed.

It is a well known fact that insects of any kind or class cannot live in or survive a bath of live steam, and by means of my improvement all such insects that can be reached directly or indirectly may be destroyed as may also all eggs or larvæ of such insects.

My improved vaporic steam gun, by reason of the use of the flask $k^2$ is also particularly designed for use in the destruction of flying insects, such as mosquitos, flies, fleas, moths and the like, and in practice the said flask is filled with an essential oil, the vapor of which is destructive of such insects, and in the use of the device the steam escaping from the nozzle or supplemental nozzle tube $j^3$ will draw out vapor from said flask or vaporize the oil therein and mingle said vapor with the escaping steam, and the said insects will either be destroyed or driven from the house in which the device is used.

My improved vaporic steam gun may also be used in some of the trades or arts, as for instance in thawing out frozen pipes, in which operation a plumber or other operator may direct a steam jet into or against such pipes, or in cleaning out pipes clogged with grease or other substances, in which operation a jet of steam may be directed into such pipes, and the said device may also be used for sterilizing and cleaning meat blocks and other fixtures, and as a sterilizer in hospitals and other places and for fumigating rooms or compartments.

In practice, the boiler $f$ is partially filled with water and the amount of water employed is never so great as to close the ports or passages $h^3$ through which the steam passes from the boiler into and through the pipe $h$.

The object of the packing $j^4$ on the cylindrical plug $j^2$ is to make the supplemental nozzle tube $j^3$ fit snugly on said tube.

The nozzle tube $j$ may be turned entirely around on the plug $i$ so as to direct the discharge from the nozzle into any desired position, and as hereinbefore described the handle yoke $g$ and the boiler $f$ may be held in any desired position.

If, in the operation of the device, the steam pressure should become too great, the supplemental nozzle tube $j^3$ will be forced outwardly by pressure in the outer end thereof till the plunger head $j^6$ is inwardly of the ports or passages $j^7$ at which time the pressure in the nozzle or in the outer end of the supplemental nozzle tube $j^3$ will be discharged through said ports or passages, and the said supplemental nozzle tube may be moved backwardly into its normal position as shown in Fig. 2.

Having fully described my invention, what I claim as new and desire to secure by Letters Patent, is:—

1. A vaporic steam gun comprising a boiler, a burner, a tube passing into said boiler and secured therein, a plug detachably secured in the outer end of said tube, a main nozzle tube mounted on said plug, a plug secured in the outer end of the main nozzle tube, a supplemental nozzle tube mounted on the last named plug and movable longitudinally thereon, a steam tube secured in the first named plug and passing through the last named plug and provided with a plunger which fits in the supplemental nozzle tube, said supplemental nozzle tube being provided with side ports or passages, and the outer end thereof being provided with a discharge nozzle.

2. A vaporic steam gun comprising a boiler, a burner, a tube passing into said boiler and secured therein, a plug detachably secured in the outer end of said tube, a main nozzle tube mounted on said plug, a plug secured in the outer end of the main nozzle tube, a supplemental nozzle tube mounted on the last named plug and movable longitudinally thereon, a steam tube secured in the first named plug and passing through the last named plug and provided with a plunger which fits in the supplemental nozzle tube, said supplemental nozzle tube being provided with side ports or passages, and the outer end thereof being provided with a discharge nozzle, and a flask connected with one side of the supplemental nozzle tube, the outer end portion of which is closed by a detachable plug and provided with a tube or tubes which pass therethrough, and the inner end or ends of which are open and the outer ends of which terminate adjacent to the discharge of the nozzle.

3. A device of the class described provided with a discharge nozzle at one side of which is a flask, the outer end of said flask being closed by a detachable plug and tubes passing through said plug and the inner ends of which are open, the open end of one of said tubes terminating adjacent to one end of said flask and the open end of the other adjacent to the other end of said flask.

4. In a vaporic steam gun, a spherical boiler, a rod or shaft passing centrally therethrough, a burner casing loosely suspended from the end portions of said rod or shaft and provided with an open bottom, a burner adapted to be inserted into and removed from said casing through said open bottom, said casing being provided with perforations, a shield at one side of said casing, a yoke-shaped handle device mounted on the opposite end portions of said rod or shaft and adapted to be secured thereto, a tube passing radially and vertically into said reservoir when the parts of the device are in their normal position, the outer end portion of said tube being curved laterally, a plug secured in said tube, a main nozzle tube rotatably mounted on said plug, a plug secured in the opposite end of the main nozzle tube, a supplemental nozzle tube slidably mounted on the last named plug and provided adjacent to its outer end portions with side ports or passages, and a steam tube passing through and secured in the first named plug and passing through the last named plug and provided at its end with a plunger head which fits in the supplemental nozzle tube, said supplemental nozzle tube being provided at its outer end with a discharge nozzle.

5. In a vaporic steam gun, a spherical boiler, a rod or shaft passing centrally therethrough, a burner casing loosely suspended from the end portions of said rod or shaft and provided with an open bottom, a burner adapted to be inserted into and removed from said casing through said open bottom, said casing being provided with perforations, a shield at one side of said casing, a yoke-shaped handle device mounted on the opposite end portions of said rod or shaft and adapted to be secured thereto, a tube passing radially and vertically into said boiler when the parts of the device are in their normal position, the outer end portion of said tube being curved laterally, a plug secured in said tube, a main nozzle tube rotatably mounted on said plug, a plug secured in the opposite end of the main nozzle tube, a supplemental nozzle tube slidably mounted on the last named plug and provided adjacent to its outer end portions with side ports or passages, and a steam tube passing through and secured in the first named plug and passing through the last named plug and provided at its end with a plunger head which fits in the supplemental nozzle tube, said supplemental nozzle tube being provided at its outer end with a discharge nozzle, and a flask supported adjacent to said supplemental nozzle tube, the outer end of which is closed by a detachable plug, said flask being provided with two tubes which pass through said detachable plug and terminate adjacent to the outlet of the discharge nozzle, and the inner ends of which are open and terminate one adjacent to one end of said flask and the other adjacent to the other end thereof.

6. A vaporic steam gun comprising a spherical boiler, a shaft or rod passing centrally therethrough and secured thereto, a burner casing suspended from the opposite end portions of said shaft or rod and adjustable toward and from the boiler, a burner adapted to be inserted into said casing and removed therefrom, a handle device connected with the opposite end portions of the rod or shaft, a tube passing into and secured in said boiler and in a vertical position when the boiler and casing are in their normal positions, and a discharge nozzle detachably connected with said tube and projecting at an angle thereto.

7. In a vaporic steam gun, a boiler, a heater connected therewith, a tube passing into said boiler and secured therein, and the outer end of which is provided with a plug, a nozzle device connected with the outer end portion of said tube, said nozzle device comprising a main tube rotatably mounted on said plug, a supplemental longitudinally movable tube provided with a discharge nozzle, and a steam tube secured in said plug and passing therethrough and provided at its outer end with a plunger head movable in the supplemental nozzle tube, said supplemental nozzle tube being also provided with side ports or passages.

8. In a vaporic steam gun, a boiler, a heater connected therewith, a tube passing into said boiler and secured therein, and the outer end of which is provided with a plug, a nozzle device connected with the outer end portion of said tube, said nozzle device comprising a main tube rotatably mounted on said plug, a supplemental longitudinally movable tube provided with a discharge nozzle, and a steam tube secured in said plug and passing therethrough and provided at its outer end with a plunger head movable in the supplemental nozzle tube, said supplemental nozzle tube being also provided with side ports or passages, and a flask at one side of the supplemental nozzle tube, the outer end portion of which is closed by a detachable plug, said flask being provided with two tubes which pass through said plug and the inner ends of which are open and terminate one adjacent to one end of said flask and the other adjacent to the opposite end.

9. A vaporic steam gun comprising a spherical boiler, a casing loosely and tensionally suspended from the opposite sides of said boiler, said boiler and said casing being adapted to turn one in or upon the other, a yoke-shaped handle device connected with the opposite side of said boiler at the point where the casing is connected therewith and a burner adapted to be inserted in said casing and removed therefrom.

10. A vaporic steam gun comprising a spherical boiler, a casing loosely and tensionally suspended from the opposite sides of said boiler, said boiler and said casing being adapted to turn one in or upon the other, a yoke-shaped handle device connected with the opposite side of said boiler at the point where the casing is connected therewith and a burner adapted to be inserted in said casing and removed therefrom, and said boiler being also provided with a tube which passes thereinto and is secured therein and a nozzle device connected with said tube.

11. A vaporic steam gun comprising a spherical boiler, a rod or shaft passing centrally therethrough and secured thereto, a yoke-shaped handle device connected with the outer ends of said rod or shaft, a casing loosely and tensionally suspended from the end portions of said rod or shaft and in which the bottom of the boiler is adapted to rotate, and a burner adapted to be inserted into said casing and removed therefrom, said boiler being also provided with a discharge tube and a nozzle connected with said tube.

12. In a vaporic steam gun comprising a spherical boiler, a rod or shaft passing centrally therethrough and secured thereto, a burner casing loosely and tensionally suspended from the end portions of said rod or shaft, a burner adapted to be inserted into and removed from said casing, a handle device connected with the opposite end portions of the said rod or shaft and a discharge device passed into said boiler and secured therein.

In testimony that I claim the foregoing as my invention I have signed my name in presence of the subscribing witnesses this 28th day of May 1909.

GEORGE W. BROWNE.

Witnesses:
H. R. CANFIELD,
C. E. MULREANY.